J. O. HELLIWELL.
PNEUMATIC TIRE VALVE.
APPLICATION FILED NOV. 8, 1917.
1,337,316.
Patented Apr. 20, 1920.
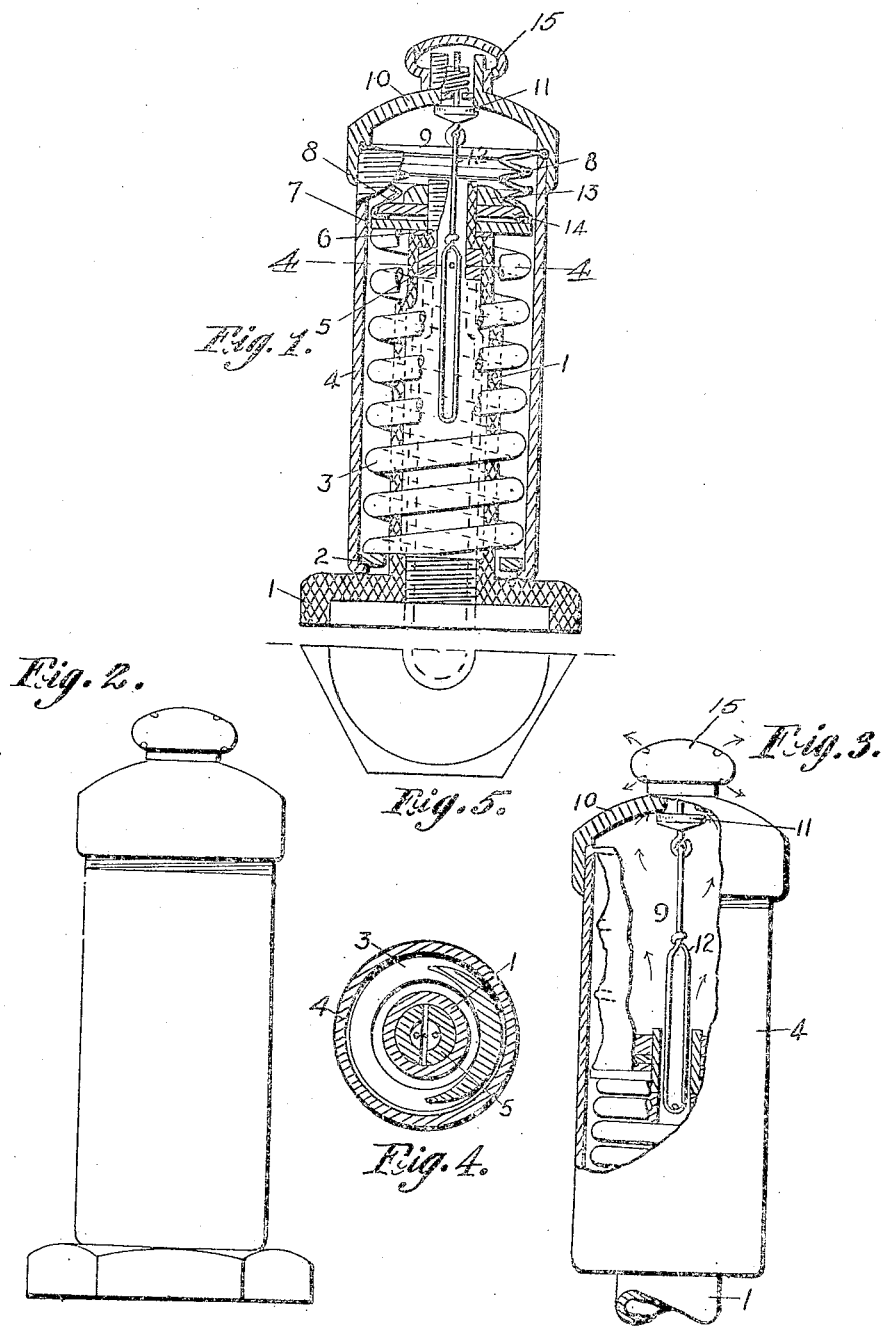

UNITED STATES PATENT OFFICE.

JOHN O. HELLIWELL, OF PASADENA, CALIFORNIA.

PNEUMATIC-TIRE VALVE.

1,337,316.  Specification of Letters Patent.  Patented Apr. 20, 1920.

Application filed November 8, 1917. Serial No. 200,962.

*To all whom it may concern:*

Be it known that I, JOHN O. HELLIWELL, a citizen of the United States, residing at Pasadena, State of California, have invented new and useful Improvements for Pneumatic-Tire Valves, of which the following is a specification.

This invention relates to a unique combination of elements in a device which may be attached to the tire valve stem of a pneumatic tire in place of the dust cap and through which the inflating medium may freely pass when the tire is in the process of inflation.

It is an object of this device to furnish a means whereby part of the inflating medium may be automatically released should its pressure rise above what is considered a safe maximum load.

Another object of this device is to provide an expansion chamber which shall minimize the effects of percussion on the tire to which it is attached.

A further object of this invention is to provide such a combination of elements as will furnish a means by which it may be determined, either visually or tactually, whether the inflating medium of the tire to which it is attached is above or below normal pressure.

With these and other objects in view, this invention applies to a unique combination of parts which shall substantially and essentially comprehend a threaded stem having mounted on its upper end a fixed piston or diaphragm and a bellows, an outer casing movable longitudinally along threaded stem and having in its outer end a dome containing a valve, and a coiled spring mounted circumferentially about the threaded stem and coacting between the underside of the fixed piston or diaphragm and the lower end of the casing.

While I have shown and described certain embodiments of the invention, it is to be understood that I do not wish to be limited to the specific construction shown, since various changes may be made therein provided the essential characteristics are retained.

An embodiment of the invention is illustrated in the accompanying drawing, whereon:—

Figure 1 is a vertical conventional section of a device incorporating the principles of this invention; Fig. 2 is an elevation of the same in which the inflating medium has not risen above normal pressure; Fig. 3 shows the device fully distended and in which part of the inflating medium is being released; Fig. 4 is a cross-section taken at 4—4; and Fig. 5 is a bottom plan view of Fig. 1.

Like parts referred to in the following description are indicated in the drawing by the same reference characters.

Assuming the invention embodied in the form illustrated, and hereinafter referred to as the governor, the stem (1) is threaded on its inner, lower surface so as to be applied to the standard tire valve stem; and is also threaded on its upper, outer surface so as to engage nut (13) which maintains piston or diaphragm washer (14) in place. Diaphragm washer (14), upper spring seat washer (7), with their retaining nut (13), may be considered as a unit and in the nature of a fixed piston or diaphragm, and will hereinafter be referred to as the fixed diaphragm. Anchor washer (5) is interposed between inner shoulder of stem (1) and end of tire valve stem, and is of suitable material such as to make a tight connection; and it further has running transversely through it a bar to which may be attached the tether link or extension (12) of the dome valve (11). The lower end of the bellows (8) is securely held between the diaphragm washer (14) and the upper spring seat washer (7), and the upper end of the bellows (8) is held firmly between the shoulder on the inner side of the dome (10) and the upper end of the casing (4). Mounted in the dome (10) is a valve (11) which is held normally closed by its valve spring, and which opens during the process of inflation or when sufficient tension is exerted on the tether link (12). The dome (10) is also furnished with a threaded boss to permit of the attachment of an inflating means and to which may be attached the perforated cap (15). Interposed between the lower spring seat washer (7) and the shoulder of the governor stem (1) is washer (6). The casing (4), besides being threaded on its upper end to engage the dome (10), is also crimped on its lower end so as to support the lower spring seat washer (2), although if the lower end of the casing is sufficiently crimped said washer may be dispensed with. There remains the coiled governor spring (3) which is mounted circumferentially about stem (1) and coacting with and between the upper spring seat washer (7) and the lower spring seat washer (2).

It will be noted that the stem (1) with the washers (14) and (7), and retaining nut (13), may be considered as forming a substantially integral unit. And further it will be noted that the casing (4) with its dome (10), dome valve (11), and valve cap (15), may also be considered as a unit. It may now be understood that one of the basic features of this invention is substantially a fixed piston or diaphragm and stem, and an outer movable casing unit, with a spring coacting between the two units.

The expansion chamber referred to is that space between diaphragm washer (14) and dome (10), and is designated as (9).

Should it be deemed desirable to dispense with the automatic release feature of this device the tether link (12) may be omitted, and the expansion chamber and the means for determining whether the inflating medium is above or below normal pressure will be retained.

This device is readily attached to the tire valve stem of a pneumatic tire, the dust cap being dispensed with, and the valve of which has been removed. Its elements are so arranged that the outer casing will be held down by the governor spring until the pressure of the inflating medium exceeds the normal minimum as is shown in Fig. 2. As the pressure is increased above this minimum the outer shell will be gradually forced upward, which movement signifies to the operator that the tire pressure is at a safe load. At other times the device furnishes a ready means of ascertaining the approximate pressure within the tire. Should the tire pressure be below the normal minimum, as stated above, this will be denoted by the outer casing being in its position as indicated in the drawing; and should the operator desire to know approximately how much below the minimum the pressure is, it is only necessary to grasp the outer casing and try to raise it. The pull necessary to raise the outer casing will equal the pressure that is lacking and permits of judging roughly how much this is.

Should the pressure rise above normal the outer casing will be forced upward and the governor spring compressed until the maximum distention is reached, when the dome valve will be pulled open by the tether link and part of the inflating medium automatically released as shown in Fig. 3. This would absolutely prevent the pressure of the inflating medium from rising above the maximum pressure for which the governor is designed. This holds true of course where the automatic releasing feature is operative and has not been disconnected.

The next important feature of this device is the expansion chamber. The cubical content of a pneumatic tire is practically at its maximum under normal pressure. When a tire under normal pressure is struck, as in bumping into a curbing, passing over rails which protrude above the roadway, etc., that part of the tire at the point of percussion is momentarily forced inward, thus reducing the cubical content of the tire, and resulting in sudden, though momentary, increase in pressure. At the moment of impact the outer casing of the governor will be forced upward by the increased pressure, thus adding the increased cubical content of the expansion chamber to the momentarily decreased cubical content of the tire and in this manner the pressure is prevented from rising as high as it otherwise would. The casing is immediately forced back to the position before the impact by the action of the governor spring. The functioning of the expansion chamber tends to maintain the normal resilience of the tire. It also reduces the excessive strain that the weakest part of the tire would otherwise undergo, and it thus tends to prevent or defer what might have resulted in a blow-out.

What I claim is:

1. In combination a valve, pressure governor, and expansion chamber, so constructed as to be attached to a suitable tire valve stem, such stem providing a continuous passage through which the inflating medium may pass freely at all times between the tire and the expansion chamber, said combination consisting mainly of a threaded stem having mounted on its upper end a fixed diaphragm and bellows, the upper rim of said bellows being held between a dome and the upper edge of a casing which is movable longitudinally along the stem; the combination of the dome, bellows and diaphragm, providing an expansion chamber the cubical content of which is controlled by a coiled spring mounted circumferentially about the governor stem and coacting with and between the underside of the diaphragm and the lower end of the casing; said spring forcing down said casing so long as the tire pressure remains below the desired minimum.

2. In combination a valve, pressure governor, and expansion chamber, so constructed as to be attached to a suitable tire stem, such tire stem providing a continuous passage through which the inflating medium may at all times pass freely between the tire and the expansion chamber, said combination consisting mainly of a threaded stem having mounted on its upper end a fixed diaphragm and bellows, which combined with a casing movable longitudinally, provides an expansion chamber; the cubical content of said expansion chamber being controlled by a coiled spring mounted circumferentially about the threaded stem and co-acting between the underside of the fixed diaphragm and the lower end of the casing; said casing having threaded on its upper end a dome containing a valve which is fitted with a removable, perforated cap; said dome valve co-acting against a valve seat in the dome and having on its upper end a valve stem, valve spring and valve spring seat, which serve to hold the valve normally closed, and said valve having on its lower end a link or extension which operates in conjunction with an anchor bar to open said valve when the casing shall have been forced a predetermined distance by the abnormal pressure in the expansion chamber.

3. In combination a valve, pressure governor, and expansion chamber, so constructed as to be attached to a suitable tire stem, such tire stem providing a continuous passage through which the inflating medium may pass freely at all times between the tire and the expansion chamber; said combination consisting mainly of a threaded stem having mounted on its upper end a fixed diaphragm and bellows, which combined with a casing movable longitudinally, provides an expansion chamber; the cubical content of said expansion chamber being controlled by a spring which co-acts with and between the underside of the fixed diaphragm and the lower end of the casing; said casing having threaded on its upper end a dome containing a valve operative during the process of inflation, and which is fitted with a removable perforated cap, said valve co-acting against a valve seat in the dome, and having on its upper end a valve stem, valve spring, and valve spring seat which serve to hold the valve normally closed; said dome being fitted with a threaded boss to which the nipple of an inflating means may be attached.

In witness that I claim the foregoing, I have hereunto subscribed my name this 1st day of November, 1917.

JOHN O. HELLIWELL.

Witnesses:
   JAMES W. MARSH,
   CLAUDE STONE.